Figure 1:
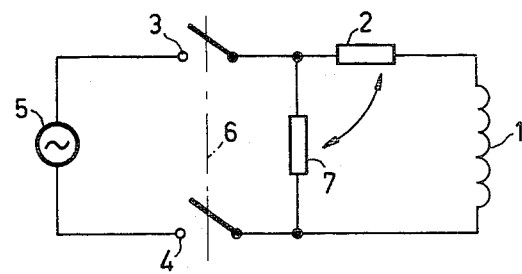

United States Patent [19]

Belhomme

[11] 4,357,590

[45] Nov. 2, 1982

[54] COMPOSITE THERMISTOR COMPONENT

[75] Inventor: Charles J. G. Belhomme, Brussels, Belgium

[73] Assignee: U.S. Philips Corporation, New York, N.Y.

[21] Appl. No.: 182,194

[22] Filed: Aug. 28, 1980

[30] Foreign Application Priority Data

Aug. 28, 1979 [NL] Netherlands .......................... 7906442

[51] Int. Cl.³ .............................................. H01C 7/02
[52] U.S. Cl. ......................................... 338/23; 315/8; 338/22 R; 361/150
[58] Field of Search .................. 338/22 R, 22 SD, 23, 338/322, 328, 324, 325, 332; 315/8; 361/150

[56] References Cited

U.S. PATENT DOCUMENTS

| | | |
|---|---|---|
| 3,376,451 | 4/1968 | Mears .................................. 315/8 X |
| 3,614,519 | 10/1971 | Figlewicz .............................. 315/8 |
| 3,845,442 | 10/1974 | Ihaya et al. ........................... 338/23 |
| 3,878,501 | 4/1975 | Moorhead et al. ............... 338/23 X |
| 3,898,422 | 8/1975 | Fuller et al. .................... 338/328 X |
| 4,024,427 | 5/1977 | Belhomme ............................. 315/8 |

Primary Examiner—C. L. Albritton
Attorney, Agent, or Firm—Paul R. Miller

[57] ABSTRACT

A component consisting of two coupled PTC thermistors with the first thermistor having a lower cold resistance than the second thermistor and the first thermistor having a higher resistance at the operating temperature than the second thermistor. According to the invention, the electric connection to the second thermistor is made directly by solely mechanical contacts to the surface of the ceramic thermistor body. This means a considerable simplification during manufacture, as the second thermistor need not be provided with electrode layers.

7 Claims, 2 Drawing Figures

COMPOSITE THERMISTOR COMPONENT

The invention relates to a composite thermistor component comprising two thermistors having a positive temperature coefficient of the resistance, the thermistors being thermally coupled to one another, to a degaussing circuit in which the component is incorporated and to colour television receiver comprising a shadow-mask picture display tube and a degaussing circuit of this type.

Such a composite thermistor component, which is described in United Kingdom patent specification No. 1,531,277 comprises a first thermistor and a second thermistor which each have a positive temperature coefficient of resistance, the second thermistor having a resistance which is substantially higher than the resistance of the first thermistor when the thermistors are in the unoperated (cold) condition, the two thermistors being thermally coupled such that in operation the second thermistor contributes to the heating of the first thermistor and that the resistance of the second thermistor at the final operating temperature of the component is lower than the resistance of the first thermistor.

It is an object of the invention to considerably simplify the composite thermistor component and according to the invention it is characterized in that the electrical connection to the second thermistor is made directly by solely mechanical contacts to the surface of the ceramic thermistor body.

Figure 2:
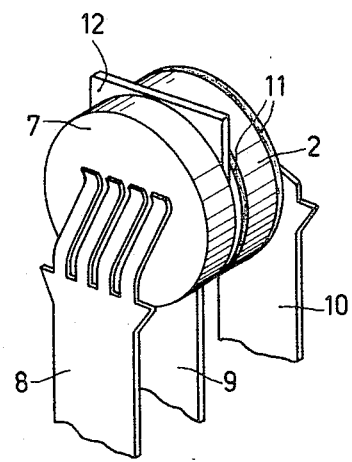

The present invention will be described without limitation by reference to the drawing figures wherein FIG. 1 is a schematic representation of a circuit used for degaussing metal parts, and FIG. 2 is a view of a structure in accordance with the present invention.

The composite thermistor component is inter alia used in a circuit for degaussing metal parts, particularly the inner shield and the shadow mask, of a colour television display tube. A first thermistor 2 is connected in a series arrangement with a degaussing coil 1 to a first (3) and second (4) terminal for an alternating mains supply (5) via a switch (6), the first thermistor having a positive temperature coefficient of resistance, and the second thermistor 7 has a positive temperature coefficient of resistance connected in parallel with the series arrangement of coil 1 and thermistor 2. The two thermistors are thermally coupled because they are in intimate contact with one another. This is shown in FIG. 1 by means of an arrow.

The description and the drawing of the abovementioned United Kingdom patent specification give the impression that the two thermistors are contacted directly by means of the ceramic surfaces. For a person skilled in the art, the use of ceramic components having metallized areas of contact in an electrical circuit has, however, always been such a matter of course that the presence of such metallized areas of contact had been omitted from the description for the sake of simplicity.

As a matter of fact, contacting by way of the ceramic surface by mechanical contact only can only be effected on the parallel thermistor in the circuit, that is to say the thermistor which, in the unoperated condition, has the higher resistance, contributes to heating the other thermistor during operation and has at the prevailing temperature a resistance which is lower than that of the other thermistor.

The thermistor which is in series with the degaussing coil must be of a low resistance during the unoperated condition and the metallized layer which is in intimate contact therewith must be present on substantially the entire surface area. Contacting of the series thermistor body by solely mechanical contacts only directly to the surface of the thermistor body does not result in a useful component.

Relative to the component which is known from the United Kingdom patent specification No. 1,531,277, in which the second thermistor (7) is provided with a vacuum-deposited nickel-chromium nickel-chromium layer onto which a thin silver layer has been vacuum-deposited, which silver layer is reinforced with a silver paste, the second thermistor must be somewhat changed to obtain a composite component according to the invention having similar operating characteristics. The material must have a Curie point which is approximately 10° C. higher than that of the material used for the second thermistor in the United Kingdom patent specification No. 1,531,277 component in order to achieve this.

In FIG. 2, reference numerals 2 and 7 denote the thermistors which have been given the same reference numerals as in FIG. 1, that is to say 7 is the thermistor having a positive temperature coefficient and a resistance value which is higher than that of thermistor 2 when the thermistors are in the unoperated (cold) condition and a resistance value at the final operating temperature which is lower than the resistance value of thermistor 2.

Thermistor 2 is provided on each major surface by vacuum deposition with a 0.1 $\mu$m thick Ni-Cr layer, onto which a 0.3 $\mu$m thick silver layer and a 10 $\mu$m silver containing layer are deposited, the three superposed layers constituting a contact layer 11. Thermistor 7 is built-in without having been provided with a contact layer on either major surface. In the composite thermistor component, the major surface of the thermistor 7 which is opposed to the thermistor 2 bears directly against a silver-plated stainless steel plate 12, which is provided with a feed-through 9 to the circuit, and the silver-plated stainless plate 12 bears against the contact layer 11 on the opposed major surface of the thermistor 2. On both sides the silver-plated stainless steel contact springs 8 and 10 push against the thermistors, that is to say contact spring 8 is in direct contact with the ceramic surface of thermistor 7 and contact spring 10 is in direct contact with the contact layer 11 on thermistor 2.

In one embodiment thermistor 2 has a composition
$Ba_{0,80} Ca_{0,10} Sr_{0,10} TiO_3 + 0,3$ mole % $TiO_2 + 0,4$ mole % $Sb_2O_3$ and 0,08 mole % MnO.
This thermistor has a resistance value of approximately 40 Ohm at 25° C., the Curie point being 75° C.

Thermistor 7 has the composition:
$B_{0,70} Ca_{0,10} Pb_{0,20} TiO_3 + 3$ mol % $TiO_2 + 0,4$ mol % $Sb_2O_3 + 0,08$ mol % MnO.
This material has a Curie point of 180° C. The resistance value of the thermistor at 25° C. was not determined without contact layers, which is difficult to achieve, but with vacuum-deposited contact layers, a resistance of 50 to 400 Ohm then been measured.

In the construction of the thermistor as described in United Kingdom patent specification No. 1,531,277, provided with vacuum-deposited NiCr+Ag and a silver-containing layer, material was used having a Curie point of 170° C. and a resistance of the thermistor at 25° C. of 800–4000 Ohm. The relevant composition was:

$Ba_{0,72}Ca_{0,10}Pb_{0,18}TiO_3 + 0,3$ mol % $TiO_2 + 0,4$ mole % $Sb_2O_3 + 0,08$ mole % MnO.

What is claimed is:

1. A thermistor component comprising
   a first positive temperature coefficient of resistance thermistor,
   a second positive temperature coefficient of resistance thermistor thermally in contact with said first thermistor, said second thermistor having a resistance substantially higher than the resistance of said first thermistor in the unoperated condition, and said second thermistor having a resistance lower than the resistance of the first thermistor at an operating temperature, wherein said second thermistor contributes to heating of said first thermistor during operation,
   electrical connection to said first thermistor applied through metallic contact layers on said first thermistor, and
   electrical connection to said second thermistor applied solely by mechanical contacts to a surface of said second thermistor, wherein said first thermistor has contact layers at opposite major faces, and said second thermistor has opposite major faces free of contact layers.

2. A degaussing circuit having a thermistor component as claimed in claim 1, in which said first thermistor is connected in a series arrangement with a degaussing coil and an alternating mains supply, and said second thermistor is connected in parallel with said series arrangement.

3. A thermistor component comprising
   a first positive temperature coefficient of resistance thermistor,
   a second positive temperature coefficient of resistance thermistor thermally in contact with said first thermistor, said second thermistor having a resistance substantially higher than the resistance of said first thermistor in the unoperated condition, and said second thermistor having a resistance lower than the resistance of the first thermistor at an operating temperature, wherein said second thermistor contributes to heating of said first thermistor during operation,
   electrical connection to said first thermistor applied through metallic contact layers on said first thermistor, and
   electrical connection to said second thermistor applied solely by mechanical contacts to a surface of said second thermistor, wherein said mechanical contacts include contact springs in direct contact with a major face of said second thermistor, and wherein at least one of said contact springs is in contact with a contact layer on said first thermistor.

4. A thermistor component comprising
   a first positive temperature coefficient of resistance thermistor,
   a second positive temperature coefficient of resistance thermistor thermally in contact with said first thermistor, said second thermistor having a resistance substantially higher than the resistance of said first thermistor in the unoperated condition, and said second thermistor having a resistance lower than the resistance of the first thermistor at an operating temperature, wherein said second thermistor contributes to heating of said first thermistor during operation,
   electrical connection to said first thermistor applied through metallic contact layers on said first thermistor, and
   electrical connection to said second thermistor applied solely be mechanical contacts to a surface of said second thermistor, wherein said first and second thermistors each have a major face in contact with a feedthrough plate, wherein said mechanical contacts include contact springs in direct contact with a major face of said second thermistor, and wherein at least one of said contact springs is in contact with a contact layer on said first thermistor.

5. A thermistor component according to claim 1, wherein said first and second thermistors are ceramic.

6. A thermistor component according to claim 1, wherein said first thermistor has a Curie point of 75° C. and said second thermistor has a Curie point of 180° C.

7. A thermistor component comprising
   a first positive temperature coefficient of resistance thermistor,
   a second positive temperature coefficient of resistance thermistor thermally in contact with said first thermistor, said second thermistor having a resistance substantially higher than the resistance of said first thermistor in the unoperated condition, and said second thermistor having a resistance lower than the resistance of the first thermistor at an operating temperature, wherein said second thermistor contributes to heating of said first thermistor during operation,
   electrical connection to said first thermistor applied through metallic contact layers on said first thermistor, and
   electrical connection to said second thermistor applied solely by mechanical contacts to a surface of said second thermistor, wherein said first and second thermistors each have a major face in contact with a feedthrough plate, and wherein said first thermistor has contact layers at opposite major faces, and said second thermistor has opposite major faces free of contact layers.

* * * * *